United States Patent [19]

Meister

[11] Patent Number: 4,641,630

[45] Date of Patent: Feb. 10, 1987

[54] APPARATUS FOR THE STEAM TREATMENT OF FOODS

[76] Inventor: Siegfried Meister, Siemensstrasse 2, 8910 Landsberg a. Lech, Fed. Rep. of Germany

[21] Appl. No.: 760,879

[22] Filed: Jul. 31, 1985

[30] Foreign Application Priority Data

Aug. 1, 1984 [DE] Fed. Rep. of Germany ... 8422834[U]

[51] Int. Cl.$^4$ ................................................ A21B 1/08
[52] U.S. Cl. ....................................... 126/20; 126/348; 126/369; 219/401
[58] Field of Search ............... 126/200, 20, 20.1, 20.2, 126/190, 198, 348, 369, 369.1–369.3, 382; 62/285, 288; 34/198; 312/31.03, 31.06, 31.1, 138 R, 229; 219/400, 401, 522; 422/26, 295, 310; 4/596, 614; 261/DIG. 10, DIG. 76, DIG. 85

[56] References Cited

FOREIGN PATENT DOCUMENTS 13407 5/1928 Australia .......................... 312/31.06

*Primary Examiner*—Samuel Scott
*Assistant Examiner*—Noah Kamen
*Attorney, Agent, or Firm*—Hill, Van Santen, Steadman & Simpson

[57] ABSTRACT

There is disclosed herein an apparatus for the steam treatment of foods. The apparatus includes a cooking area, a steam supply line to the cooking area and an open front having a hinged cooking area access door associated with the open front. A trough is provided below the door for collecting steam condensate. The door has a drain channel extending along the lower ledge of the door for the width of the door. The drain channel includes an opening adjacent the lower door hinge and above the collecting trough for direction condensate from the channel to the trough.

6 Claims, 3 Drawing Figures

APPARATUS FOR THE STEAM TREATMENT OF FOODS

BACKGROUND OF THE INVENTION

The invention relates to an apparatus for the steam treatment of food, with a cooking area into which issues a steam supply line and to whose open front is articulated a door, as well as with a collecting trough for the steam condensate below the cooking area access opening.

This apparatus described in German Utility Model 8,131,827 contains a steam generator or boiler, which blows steam into the cooking area via the steam supply line on setting the apparatus to "steam". If there is a sufficiently low temperature in the cooking area, the steam precipitates not only on the food in the cooking area, but also on the walls and particularly the inside of the door, where it condenses to water and the latter drains down the walls and the door. When the cooking area is closed, this steam condensate collects on the bottom thereof and is fed via a discharge tube to a drainage system.

If the cooking area door is opened, in the case of the known steamer, the water which has condensed on the inside of the door drips in an uncontrolled manner onto the floor, which is not only disadvantageous from the hygienic standpoint, but also constitutes an accident hazard.

The object of the present invention is to improve the aforementioned apparatus in such a way that the water of condensation draining down the inside of the door is collected when the door is opened.

SUMMARY OF THE INVENTION

Thus, according to the invention, on the lower door ledge is formed a channel extending along the width of the door and which is provided in the vicinity of the lower door hinge with a drain opening above the collecting trough. Thus, the water of condensation which drains away when the door is open is collected and supplied to the water drain, so that there is no contamination at the point of installation of the apparatus.

To make the condensation water drainage system from the channel into the collecting trough as compact as possible, according to a further development of the invention, the access of the drain opening is aligned with the pivot axis of the door.

The channel can either directly be shaped onto the lower door ledge or, alternatively, it can be constructed as a component separate from the door and is screwed, welded or locked to the door frame.

BRIEF DESCRIPTION OF THE DRAWINGS

The invention is described in greater detail hereinafter relative to a non-limitative embodiments and with reference to the attached drawings.

FIG. 3 is a diagrammatic sectional view through the fastening means of the door drainage channel.

Figure 1:
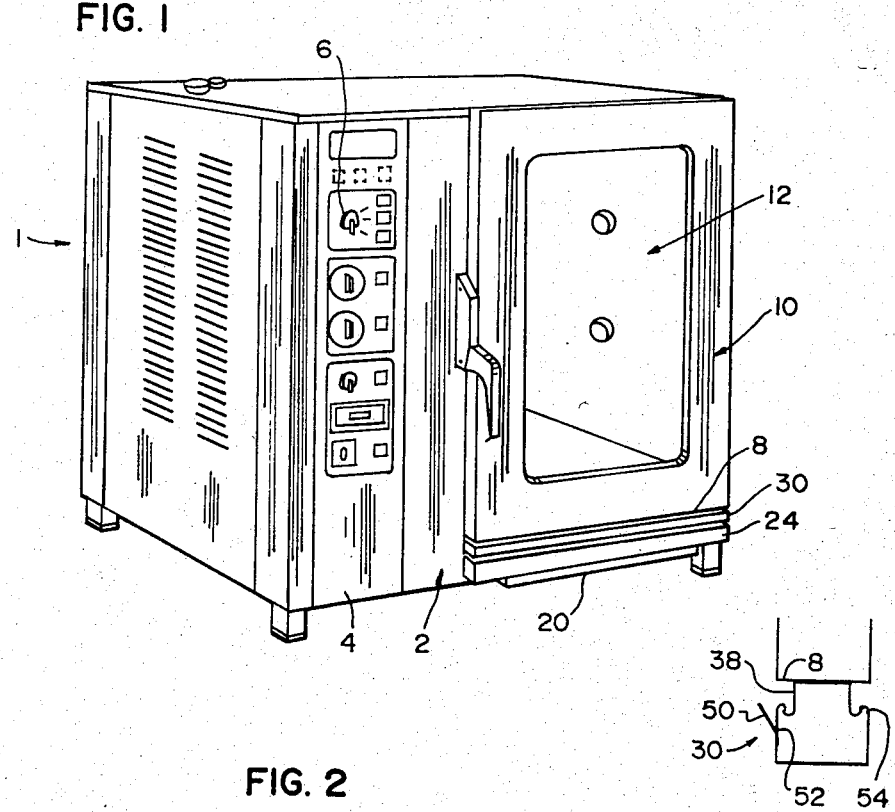
FIG. 1 is a diagrammatic perspective view of a steamer equipped with the features of the invention.

The combination steamer 1 is provided on its front 2 with a control panel 4 having a plurality of controls for the individual, selectable operating modes of said steamer. These controls include a switch 6, which can be set to the operating mode "steam".

Alongside the control panel 4 is provided an access door 10 to a cooking area 12, which is used for feeding into the latter food placed on not shown racks and which is e.g. to be steamed in the cooking area.

Alongside the cooking area 12 and behind the control panel 4 are provided the electrical control system and boiler, as described in detail in German Utility Model 8,131,827. The boiler is connected via a steam supply line to the interior of the cooking area 12.

Below the base plate 16 of the combination steamer is suspended a steam condensate trough 20, which extends slightly in front of the front wall 22 of steamer 1, in the vicinity of access door 10, of FIG. 2.

A collecting trough 24 having a rectangular cross-section is also fixed to front wall 22 below the front opening of the cooking area. The upwardly open collecting trough extends, according to FIG. 1, parallel to and below the lower ledge 8 of the closed access door 10, but still provides sufficient spacing with respect thereto for the hereinafter described door draining channel 30. The base 26 of the collecting trough contains a not shown opening, which drains off the water or fat which has collected in trough 24 into trough 20.

Figure 2:
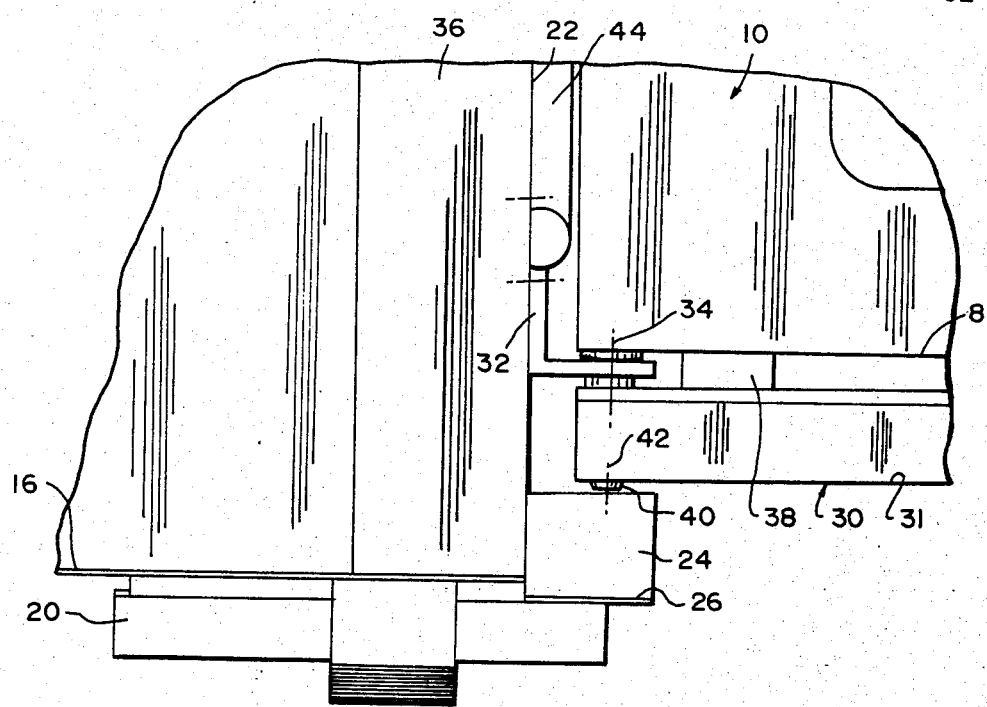
FIG. 2 is a larger-scale detail of the steamer according to FIG. 1 with the door open.

According to FIG. 2, access door 10 is mounted so as to rotate about vertical axis 34 in the bore of an angular hinge 32, which is screwed to a lateral post 36 of the steamer casing.

DESCRIPTION OF THE PREFERRED EMBODIMENTS

An upwardly open, box-shaped, elongated door draining channel 30 is fixed by means of cover plates 38 to the lower ledge 8 of access door 10. Channel 30 extends over the entire width of the access door and projects slightly over the inner face thereof, so that condensation water running down said inner face can drop into the channel 30.

FIG. 2 also shows that in the bottom 31 of channel 30 is provided a drain opening 40 at a point located below the bore of the projecting leg of the angular hinge 32. The axis 42 of drain opening 40 is aligned with the vertical axis 34, about which door 10 pivots. Thus, the drain opening 40 remains at the same point in any pivoting position of door 10. Drain opening 40 opens into the collecting trough 24, so that condensation water collected in the door draining trough 30 can pass through drain opening 40 into collecting trough 24. The condensation water can flow from the latter through the aforementioned opening in the base 26 thereof into trough 20 and the latter can be emptied after removal from its suspension attachment. Alternatively, the opening in the base 26 of collecting trough 24 can be directly connected via a not shown drain line to the water drain connection of the combination steamer 1.

For fixing the door draining channel 30 to the lower ledge 8 of door 10, e.g. two cross-sectionally, U-shaped cover plates 38 are welded by their base face to the ledge. Each of the downwardly directed legs of cover plate 38 is beaded over to the outside at the end.

The outer longitudinal edge 54 of channel 30 is beaded over inwards and can engage in the end of the outer leg of cover plate 38. The inner longitudinal edge 50 of channel 30 is bevelled outwards with respect to the latter and consequently projects over the inner face of the door 10 for collecting the draining drips if, in the represented manner, channel 30 is placed in the cover plates 38.

For example, two hooks 52 are fixed to the longitudinal edge 50 and can engage in the beaded ends of the inner leg of cover plates 38. The draining channel 30 can consequently be placed from the lock or bolt side of the door 10 on cover plates 38 up to a not shown stop member, optionally engaging in the end position thereof. According to FIG. 2, the cooking area access opening is appropriately surrounded on all sides by a sealing bead 44. On closing door 10, its inner wall has such a spacing from front wall 22, that the inner longitudinal edge 50 can project over the inner face of door 10 without conflict with the front wall 22.

However, it also falls within the scope of the invention to construct the lower ledge 8 of door 10 as a hollow section in such a way that the draining channel 30 is an integral part of the latter.

I claim:

1. An apparatus for the steam treatment of foods, which includes a cooking area, a steam supply line that issues into said cooking area, said apparatus defining an open front and having a hinged cooking area access door associated therewith, and a collecting trough for steam condensate disposed below the cooking area access door, characterized in that a door condensate channel (30) is carried on the lower ledge (8) of the door (10) and extends along the door width and which is adjacent the lower door hinge (32) and is provided with a drain opening (40) above the collecting trough (24) so that the channel pivots with the door about the hinge so as to collect condensate dripping off the door and thereby prevent condensate from falling on a floor where the apparatus sits.

2. The apparatus according to claim 1, characterized in that the axis (42) of the drain opening (40) is aligned with the pivot axis (34) of door (10).

3. The apparatus according to claim 1 or 2, characterized in that the channel (30) is formed on the lower ledge (8) of the door (10) and projects over the inner face thereof.

4. The apparatus according to claim 1 or 2, characterized in that the channel (30) is a member separate from the door (10), is fastened to the door frame and projects over the inner face of door (10).

5. The apparatus according to claim 1 or 2, characterized in that there are provided cover plates (38) fixed to the lower ledge (8) of door (10) and the channel (30) is secured to said cover plates (38).

6. The apparatus according to claim 1, wherein there is further provided a bottom collecting trough (20), for receiving liquid draining from the collecting trough (24).

* * * * *